United States Patent [19]
Oetiker

[11] Patent Number: 5,170,540
[45] Date of Patent: Dec. 15, 1992

[54] ADJUSTABLE SCREW-TYPE CLAMP

[76] Inventor: Hans Oetiker, Oberdorfstrasse 21, CH-8812, Horgen, Switzerland

[21] Appl. No.: 730,071

[22] Filed: Jul. 15, 1991

[51] Int. Cl.⁵ ............... B65D 63/00; F16L 33/00
[52] U.S. Cl. ................. 24/284; 24/20 CW; 24/279; 24/281
[58] Field of Search .......... 24/284, 279, 274 R, 24/274 WB, 274 P, 275, 280, 281, 282, 20 R, 20 EE, 20 CW, 19

[56] References Cited

U.S. PATENT DOCUMENTS

| | | | |
|---|---|---|---|
| 847,620 | 3/1907 | Thompson | 24/284 |
| 1,187,430 | 6/1916 | Kenly | 24/284 |
| 1,419,897 | 6/1922 | Palmer | 24/284 |
| 1,999,683 | 4/1935 | Borresen | 24/281 |
| 2,874,441 | 2/1959 | Duane | 24/279 |
| 3,286,314 | 1/1966 | Oetiker | 24/20 CW |
| 3,869,944 | 3/1975 | Oetiker | 24/20 CW |
| 4,299,012 | 11/1981 | Oetiker | 24/19 |
| 4,402,113 | 9/1983 | Smith | 24/279 |
| 4,521,940 | 6/1985 | Oetiker | 24/281 |
| 4,622,720 | 11/1986 | Oetiker | 24/20 EE |

Primary Examiner—Victor N. Sakran
Attorney, Agent, or Firm—Paul M. Craig, Jr.

[57] ABSTRACT

A self-retightening screw-type clamp with predetermined adjusting range for a given clamp size, attained by a predetermined number of apertures provided in the inner band portion of a separate band part in conjunction with a sleeve member of predetermined length interposed between the retightening spring and a part-cylindrical tightening member. The full adjusting range of the screw member is made possible by deforming the threads near its free end. Additionally, to facilitate assembly, the inner band portion of the separate band part is provided with a tongue-like extension which is adapted to engage with a latching device formed in the clamping band so as to hold the tongue-like extension of the inner band portion of the separate clamping band part at least close to the outer surface of the clamping band.

43 Claims, 4 Drawing Sheets

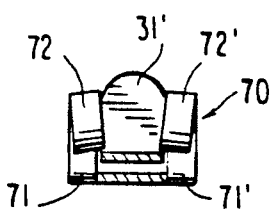
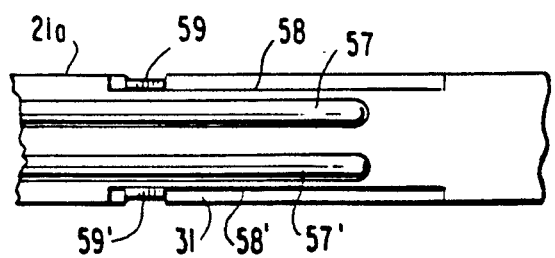
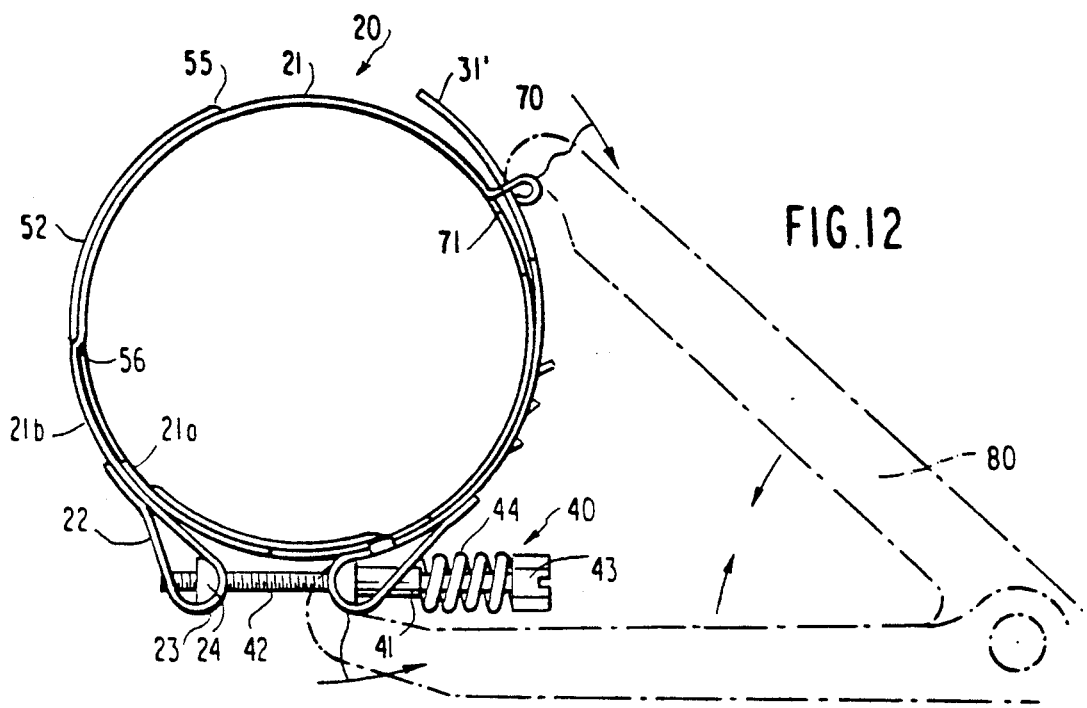
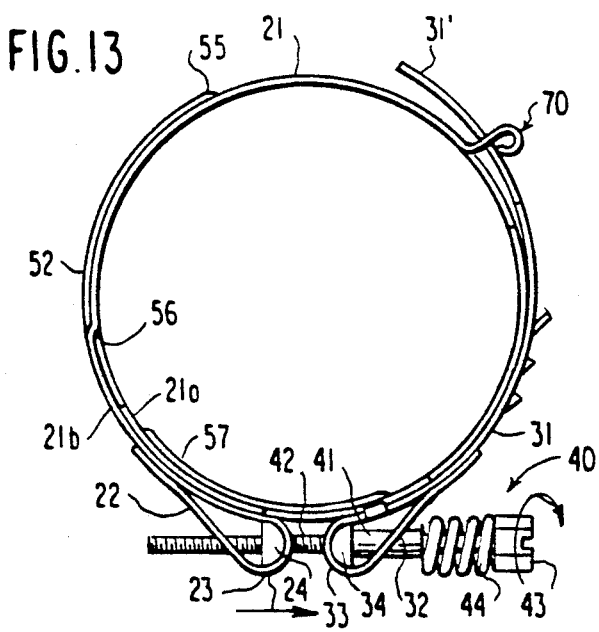
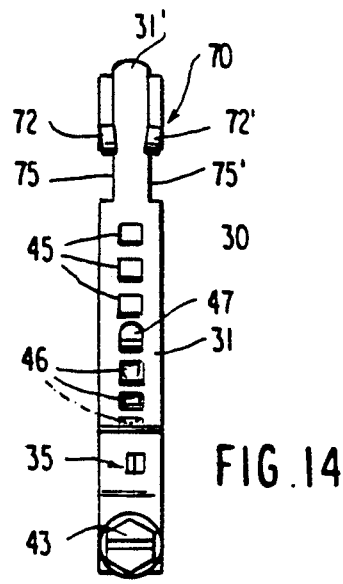

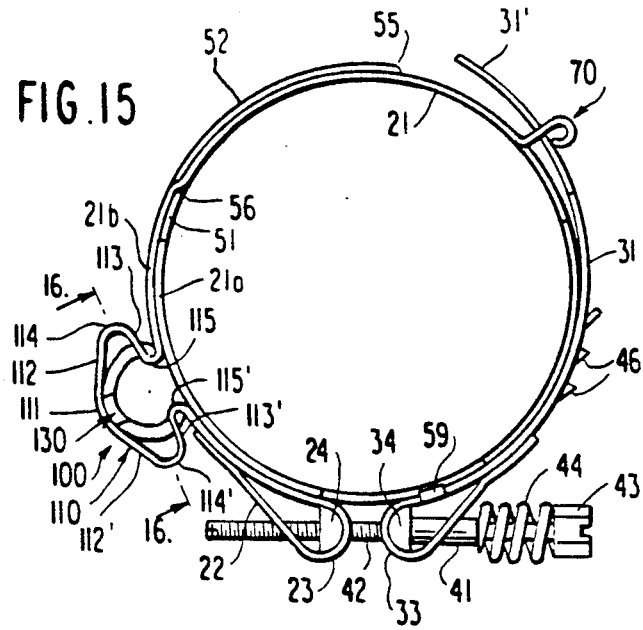
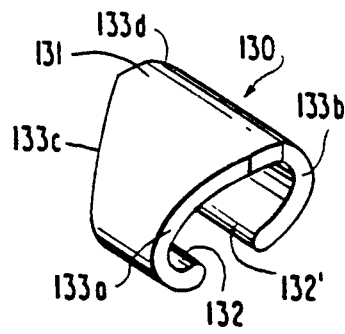
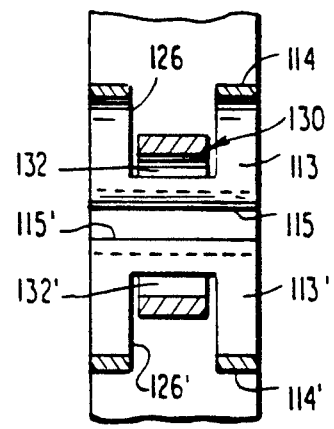
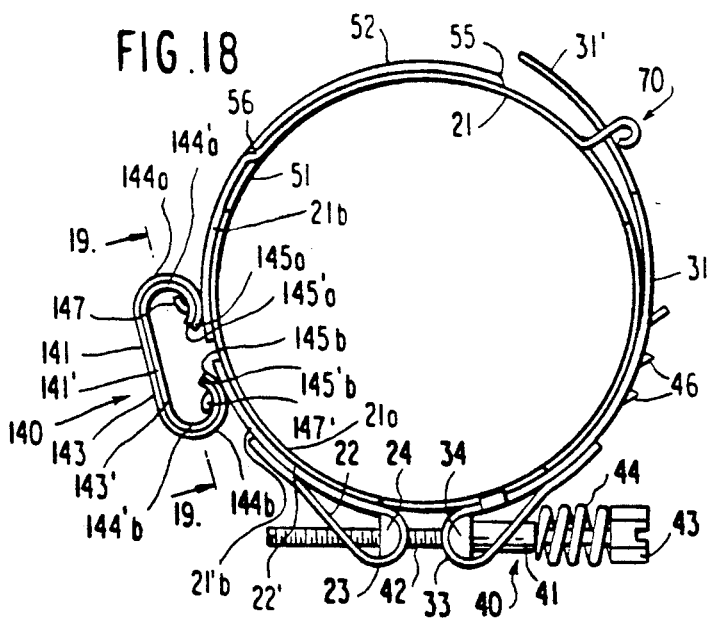
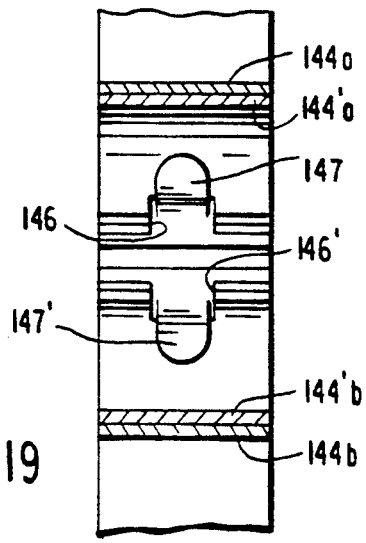

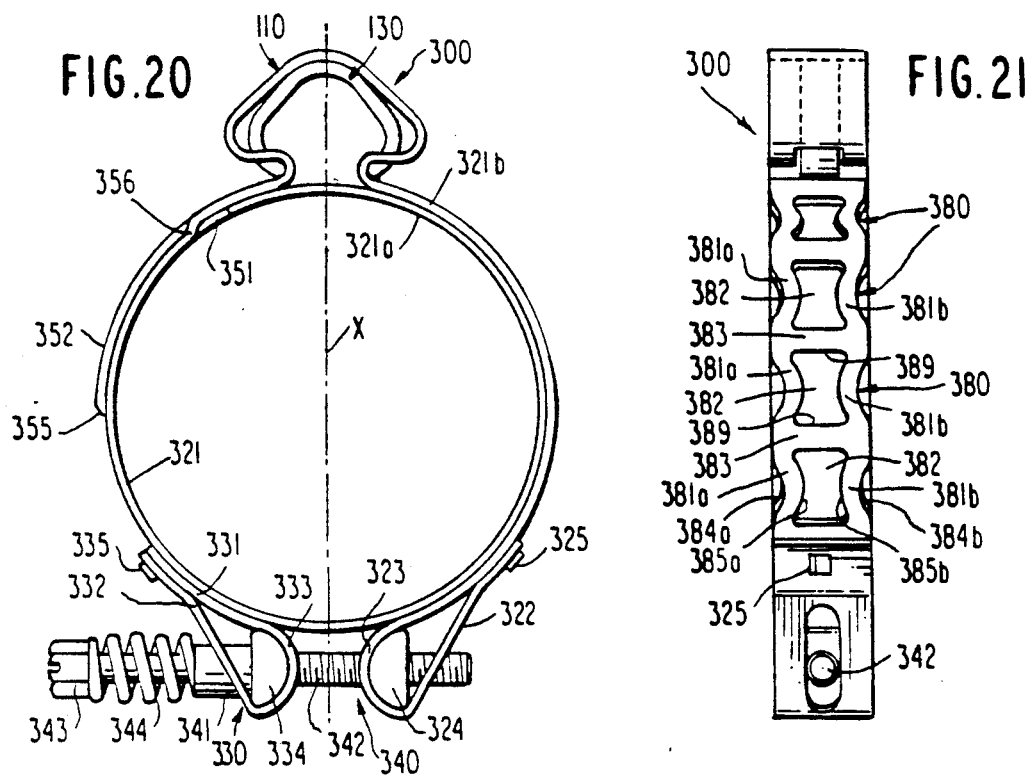
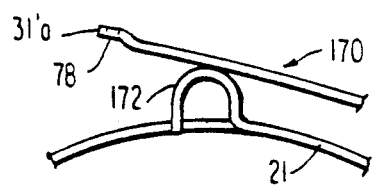
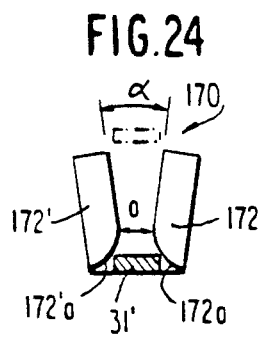
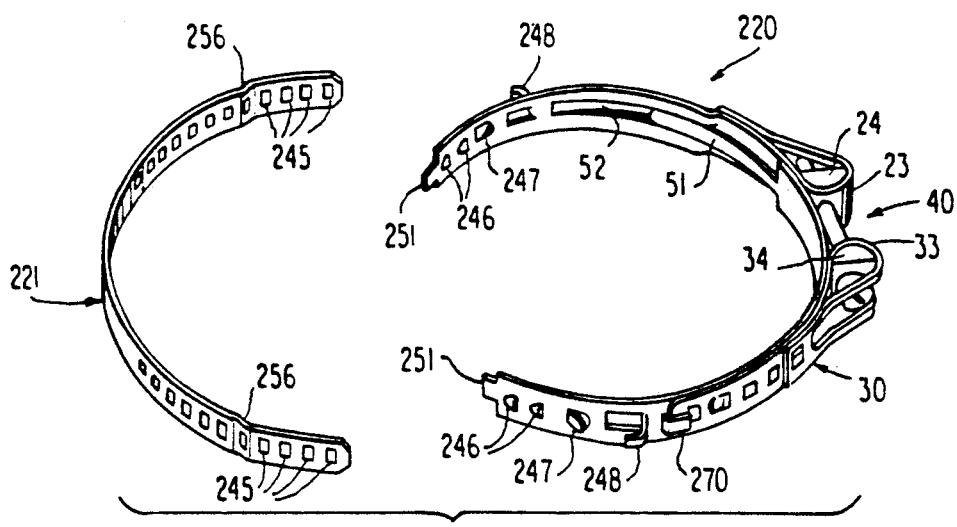

ADJUSTABLE SCREW-TYPE CLAMP

FIELD OF INVENTION

The present invention relates to an open clamp which can be mounted either axially or radially, is capable to automatically compensate for diametric changes due to temperature and/or pressure changes of the media flowing through the hose and which has an internal clamping surface devoid of any gaps, steps or discontinuities, and more particularly to a screw-type clamp which can be adjusted in its diametric dimensions over a predetermined range.

BACKGROUND OF THE INVENTION

Self-retightening clamps are required to avoid the so-called "cold-leak" problems which occur when the nipples warm up and therefore expand, thereby causing an increase in the hose diameter and when the nipples thereafter again cool off, thereby causing again a decrease in the hose diameter. Such self-retightening clamps are of importance in particular with diesel trucks, buses, tractors, large volumetric internal combustion engines and the like in which the fluid medium such as water or oil flowing through the hoses and nipples, undergoes alternate warm-up and cooling-off. To avoid "cold-leak", the clamp(s), after expansion thereof, must again be able to automatically contract to assure again tightness of the hose connection. Furthermore, if self-retightening clamps are used, it is no longer necessary to utilize only thick-walled rubber hoses in order to obtain a certain spring action in the rubber. However, though such thick-walled rubber hoses are capable of a limited breathing, they cannot avoid "cold-leak" without the then normally required retightening. Self-retightening clamps are additionally very important because they can also be used with aluminum and plastic nipples which undergo considerably larger changes in diameter than those made of steel. Furthermore, a hose connecting system utilizing self-retightening clamps will allow the use of thin-walled hoses which are more favorable from a cost point of view and additionally offer the advantage of being more flexible and more easy to handle by the assembly personnel. As is also known, the "cold-leak" problems become even more severe in cold climate, especially during the winter, when many truckers keep the truck engines running to prevent leakage of coolant.

Screw-type clamps with a clamping surface devoid of any discontinuities, gaps or steps are known from FIG. 2 of my prior U.S. Pat. No. 4,521,940 which also offer an automatic retightening by the interposition of a spring 44. The clamps disclosed in this prior patent enjoyed substantial commercial success owing to their ability to assure tightness of the hose connection under widely differing temperatures and pressures. However, some problems were encountered in the use of these clamps due to the large tolerances encountered with the hose connections for which these screw-type clamps were nominally designed. More particularly, as with other clamps, the screw-type clamps as disclosed in my aforementioned patent are manufactured in different discrete nominal sizes corresponding to the maximum hose diameter for a given hose size as used in the industry. Different nominal sizes can be realized with my prior clamps by changing the clamping band length without substantial change in the basic clamp structure. Each size of commercially available screw-type clamps embodying the invention of my aforementioned patent thereby provides limited adjustment in the diametric dimension to compensate for a limited tolerance range in the outer dimensions of the hose. This is achieved by the presence of a limited number of apertures in the separate band part to vary the effective length and therewith the diametric dimension of the clamp by selective engagement in these apertures by outwardly extending hooks fixedly positioned in the clamping band. However, the external dimensions of hoses supplied by manufacturers involve at times a tolerance range beyond the adjustment capability of these prior art screw-type clamps. This then necessitated a shutdown of the assembly line because the operator on the assembly line had to use a different size clamp on the same hose.

Another drawback encountered with the screw-type clamps according to my aforementioned patent involved the necessity to pack the clamps individually in bags so as to preclude that the separate clamping band part would swing out laterally. This, in turn, increased the cost of the clamps due to increased labor and materials.

SUMMARY OF THE INVENTION

It is a principal object of the present invention to provide a screw-type clamp of the aforementioned type which avoids by simple means the shortcomings and drawbacks encountered with the prior art clamps.

Another object of the present invention resides in a screw-type clamp which can be adjusted over a relatively larger diametric range for a given clamp size, yet can continue to be manufactured without significant increase in cost.

Still another object of the present invention resides in a screw-type clamp of the aforementioned type which can be readily installed either axially or radially and can be adjusted in its diametric dimensions in discrete steps in an extraordinarily simple manner to select that diametric dimension that most closely corresponds to the outside diameter of a given hose.

A further object of the present invention resides in a screw-type clamp of the type described above which facilitates installation of the clamp in a short period of time without the need to have to select a different clamp size to compensate for an unexpectedly large hose tolerance range.

Still another object of the present invention resides in a screw-type clamp which provides for improved retightening to compensate for still greater diametric dimension variations and changes in a very reliable manner.

Another object of the present invention resides in a screw-type clamp offering the advantages described above which can be so constructed as to minimize imbalances with use on rotating parts.

The underlying problems are solved according to the present invention in that a predetermined number of apertures are provided in the separate clamping band part to permit an initial coarse, stepwise adjustment to the approximate existing external dimensions of the hose. Additionally, the sleeve mounted over the threaded shank portion of the screw member and arranged between the retightening spring and the next-adjacent half-cylindrical tightening member is shortened which, in conjunction with a deformed end of the last threads of the tightening screw permits an increase in the adjusting range of the diametric dimensions of the clamp.

According to another feature of the present invention, the free inner end portion of the separate clamping band part is provided with a tongue-like extension adapted to engage in a detent-like latching device formed in the clamping band itself. As a result thereof, the free end of the separate clamping band part can now be provided with a larger number of apertures for the stepwise adjustment without installation problems as this free end is now held latched in close proximity to the outer surface of the clamping band, thereby also dispensing with the need for individual packaging and at the same time facilitating installation of the clamp.

According to still another feature of the present invention, the gap underneath the adjusting screw is now bridged by the full band width of the inner band portion which additionally is reinforced by two laterally spaced reinforcing ribs to assure that the inner band portion does not buckle into the gap.

According to a still further feature of the present invention, guide means are provided in the separate clamping band part to maintain correct axial positioning of the inner band portion and in particular of its tongue-like portion in relation to the tongue-receiving channel in the outer overlapping band portion, especially when the clamp is axially installed.

According to still another feature of the present invention, an auxiliary spring structure is provided in the screw-type clamp to increase the spring path, i.e., the maximum increase in diametric dimension which can be accommodated by the clamp with reliable retightening when returning to its pre-existing diametric dimension, for example, when the coolant flowing to the radiator of an internal combustion engine cools down.

Another feature of the present invention resides in so locating the auxiliary spring structure that imbalances are minimized whereby any residual imbalances can be eliminated by the use of openings properly located in the clamping band, which can advantageously be in the form of one or more sections imparting elastic stretchability to the clamping band itself.

BRIEF DESCRIPTION OF THE DRAWING

These and other objects, features and advantages of the present invention will become more apparent from the following description when taken in connection with the accompanying drawing which shows, for purposes of illustration only, several embodiments in accordance with the present invention, and wherein:

FIG. 10 is a cross-sectional view, taken along line 10—10 of FIG. 9 and illustrating the detent-like latching device in the preassembled condition;

FIG. 11 is a plan view on the inside of the clamp of FIG. 9, within the area of arrows 11—11;

FIG. 12 is an axial elevational view, similar to FIG. 9, illustrating the easy stepwise adjustability of the clamp of FIG. 9 with the use of a tool such as, for example, a conventional fuse holder;

FIG. 13 is an axial elevational view, similar to FIG. 9, illustrating the clamp in its installed tightened condition;

FIG. 14 is a right side elevational view of the clamp of FIG. 13;

FIG. 15 is an axial elevational view, similar to FIG. 13 and illustrating a screw-type clamp with an auxiliary spring structure in accordance with the present invention;

FIG. 16 is a cross-sectional view through the auxiliary spring structure taken along line 16—16 of FIG. 15;

FIG. 17 is a perspective view of the spring member inserted into the cage of the auxiliary spring structure of FIGS. 15 and 16;

FIG. 18 is an axial elevational view, similar to FIG. 15, and illustrating a modified auxiliary spring structure formed by a packet of several leaf springs interconnected between the clamping band and the outer clamping band portion;

FIG. 19 is a cross-sectional view, taken along line 19—19 of FIG. 18;

FIG. 20 is an axial elevational view, similar to FIG. 15, illustrating a balanced screw-type clamp with an auxiliary spring structure located in the clamping band to minimize any imbalance;

FIG. 21 is a right side elevational view on the clamp of FIG. 20, illustrating a clamping band provided with several sections eliminating any remaining imbalances and at the same time impart elastic stretchability to the clamping band in its longitudinal direction;

FIG. 22 is a perspective view, illustrating a modified embodiment of a do-it-yourself balanced screw-type clamp with a standard clamp part in accordance with the present invention;

FIG. 23 is a side elevational view of FIG. 24;

FIG. 24 is a front elevational view of a modified embodiment of a latching, device for use with screw-type clamps in accordance with the present invention; and FIG. 25 is a side elevational view of the latching device of FIG. 24.

DETAILED DESCRIPTION OF THE DRAWINGS

Figure 1:
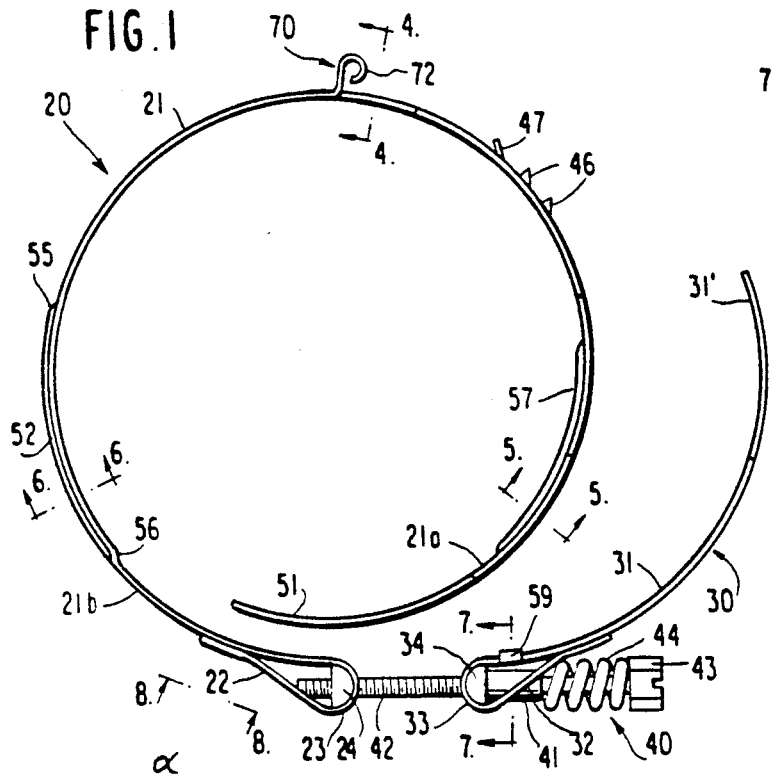
FIG. 1 is an axial elevational view of an automatically retightening screw-type clamp in accordance with the present invention showing the clamp in its open condition.

Referring now to the drawing wherein like reference numerals are used throughout the various views to designate like parts, and more particularly to FIGS. 1-14, the screw-type clamp in accordance with the present invention, generally designated by reference numeral 20, includes a generally flat clamping band 21 of predetermined width. One end of the clamping band 21 is bent back upon itself as indicated by reference numeral 22 forming a bent-back outer clamping band end portion. A loop 23 is thereby formed intermediate the bent-back portion 22 and the underlying outer band portion 21b of the clamping band 21 to retain a half-cylindrical band tightening member 24 which forms part of the screw-type mechanical tightening device used in the present invention. The half-cylindrical band-tightening member 24 is provided with a threaded bore (not shown) for purposes to be explained hereinafter. The outer bent-back end portion 22 may be provided with one or more apertures for engagement by one or more hooks provided in the underlying outer clamping band portion 21b to provide a mechanical connection. This mechanical connection may be formed, for example, by a rivet-type connection as disclosed in my prior U.S. Pat. No. 3,286,314 or may involve one or more support hooks as more fully disclosed in my prior U.S. Pat. No. 4,299,012 in conjunction with or without a guide hook. Additionally, it may also be constituted by a combined guide and support hook as disclosed, for example, in my prior U.S. Pat. No. 4,622,720. In the embodiment of FIGS. 1-14, a rivet-type connection as disclosed in my aforementioned U.S. Pat. No. 3,286,314 is shown for the sake of simplicity, which is generally indicated by reference numeral 25 in FIG. 8. The riveted connection is preferred to provide a fixed connection for ease of handling and installation which, however, may also be replaced by a spot-welded connection under certain circumstances. The outer band end portion 22 is thereby provided with an elongated slot 29 (FIG. 8) to increase the bending ability of the clamping band within this area and to accommodate the free end of the screw shank portion 42 during final tightening of the clamp by means of the screw-type tightening device generally designated by reference numeral 40. An additional slot-like opening (not shown) is provided within the area of the pocket-like loop 23 to permit extension therethrough of the shank portion 42 and to increase the bending ability within that area. This additional slot-like opening may also extend a predetermined distance into the underlying outer band portion 21b of the clamping band, or a separate further slot-like opening may also be provided as described in my U.S. Pat. No. 4,521,940.

Figure 7:
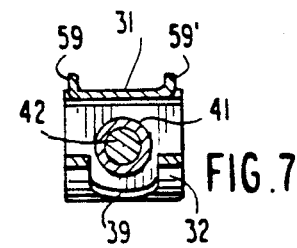
FIG. 7 is a cross-sectional view through the separate clamping band part, taken along line 7—7 of FIG. 1.
Figure 8:
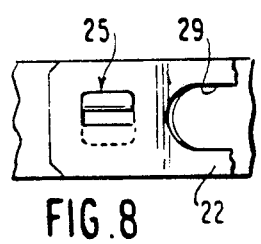
FIG. 8 is a plan view on a part of the outer band portion of the screw-type clamp, within the area of arrows 8—8 of FIG. 1.
Figure 9:
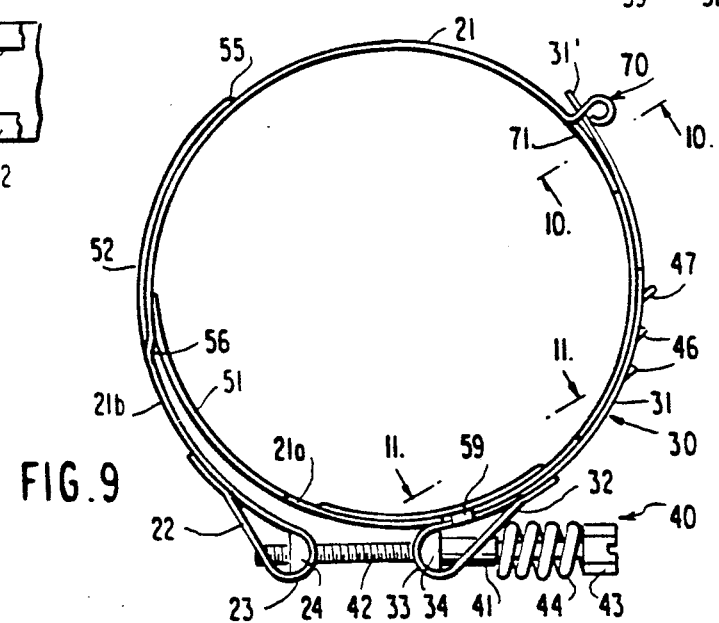
FIG. 9 is an axial elevational view of the screw-type clamp of FIG. 1, illustrating the parts thereof in their preassembled condition.

A separate clamping band part generally designated by reference numeral 30 includes an inner band portion 31 as well as a bent-back outer end portion 32 forming a pocket-like loop 33 to retain the half-cylindrical band tightening member 34 which is provided with a non-threaded bore (not shown) for purposes to be explained hereinafter. The outer band end portion 32 is provided with one or more apertures for engagement by one or more hooks in the inner band portion 31 to provide a mechanical connection which may be of the same type as the connection between the outer bent-back portion 22 and the underlying inner portion of the clamping band 21. Preferably a single substantially rectangular aperture is again provided in the bent-back outer end portion 32 for engagement by a tab-like member extending in the longitudinal direction of the underlying separate clamping band part 31 which is then bent over to provide a rivet-like connection generally designated by reference numeral 35 (FIG. 14) as disclosed in my U.S. Pat. No. 3,286,314. As explained in connection with the pocket-like loop 20 and adjoining band portions, longitudinal slots may again be provided in the outer bent-back end portion 32 and in the pocket-like loop 33 to increase the bending ability of the band part within the corresponding areas as also to provide openings for the threaded shank portion 42 of the screw-type tightening device 40, whereby one slot-like opening 39 is shown in FIG. 7.

The screw-type tightening device 40 serves to draw together the open ends of the clamping band 21. For that purpose, the screw-type tightening device 40 includes a threaded shank portion 42 and a screw head 43, preferably a hexagonal screw head 43 (FIG. 3) to facilitate threaded adjustment on the assembly line as also in the after-market by the use of a flexible-shaft screwdriver. A cylindrical sleeve 41 is mounted over the threaded shank portion 42 intermediate the band tightening member 34 and the screw head 43 with interposition of a retightening spring 44 between the cylindrical sleeve 41 and the screw head 43 to provide automatic retightening. The retightening spring 44 may be of any conventional type, such as a coil spring, cup springs and the like.

The inner band portion 31 of the separate clamping band part 30 is provided with a predetermined number of rectangular apertures 45 (FIGS. 3 and 14) for receiving therein one or more hooks 46, 47 punched out of the clamping band 21 to provide thereby a mechanical connection between the inner band portion 31 of the separate clamping band part 30 and the clamping band 21. The hooks 46 thereby consist of at least two support hooks 46 and a guide hook 47 as disclosed in my prior U.S. Pat. No. 4,299,012. However, contrary to the screw-type clamp of my aforementioned U.S. Pat. No. 4,521,940, there no longer exists the need for a guide hook 47 which can now be replaced by a third support hook 46 owing to the hold-down feature for the tongue-like portion 31' of the inner band portion 31 by the latching device 70 according to the present invention, which will be described more fully hereinafter. The support hooks 46 are thereby preferably of the cold-deformed type as described in my aforementioned prior U.S. Pat. No. 4,299,012.

Figures 5, 6:
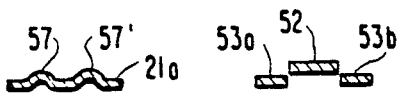
FIG. 5 is a cross-sectional view through the inner band portion, taken along line 5—5 of FIG. 1.
FIG. 6 is a cross-sectional view through the outer band portion, taken along line 6—6 of FIG. 1.

A tongue-like portion 51 is provided at the free end of the inner clamping band portion 21a of the clamping band 21 which is adapted to engage into a pressed-out channel-like indentation 52 leaving lateral portions 53a and 53b in the band (FIG. 6). These lateral portions 53a and 53b are thereby separated from the bottom of the pressed-out channel-like indentation 52 by one or several longitudinal cuts on each side. A step-like portion 56 in each of the lateral portions 53a and 53b which raises the lateral portions 53a and 53b substantially to the radial height of the channel-like indentation 52 constitutes the beginning of the latter whose end, away from the pocket-like loop 23, is formed by another small step-like portion 55. This arrangement assures a clamping surface completely free of any gaps, discontinuities or steps as more fully disclosed in my prior U.S. Pat. No. 4,299,012.

Figure 2:
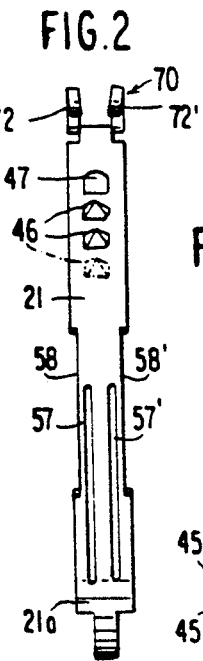
FIG. 2 is a right side view of the inner band portion as shown in FIG. 1 with the outer band portion removed.
Figure 3:
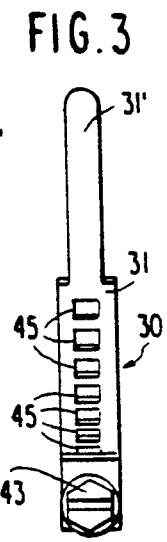
FIG. 3 is a right side view of the outer band portion of FIG. 1.

In order to reliably prevent buckling of the full width inner clamping band portion 21a into the gap underneath the threaded shank portion 42 of the tightening device 40 intermediate the two pocket-like loops 23 and 33, the inner clamping band portion 21a is provided with two inwardly extending, laterally spaced reinforcing ribs 57 and 57' (FIG. 2). Additionally, the inner band portion 21a is provided within the area of the ribs 57 and 57' with two substantially rectangular cut-outs 58 and 58' (FIG. 2) on opposite sides of the clamping band and of a depth somewhat greater than the thickness of the band so as to be able to cooperate with the inwardly projecting guide tabs 59 and 59' (FIGS. 1, 7, 9 and 11) formed in the inner band portion 31 of the separate clamping band part 30 near the area where the pocket-like loop 33 commences. The reinforcing rib-like indentations 57 and 57' are thereby located close to the outer edge of the inner band portion reduced by the cut-outs 58 and 58'. The guide tabs 59 and 59' assure the continuing correct position of the inner band portion 21a relative to the outer band portion 21b and in particular the correct position of the tongue-like portion 51 relative to the channel-like indentation. This is of importance especially during axial installation of the clamp.

Figure 4:
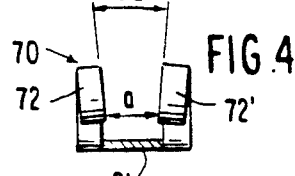
FIG. 4 is a cross-sectional view through the detent-like latching device, taken along line 4—4 of FIG. 1.

As can be seen from FIGS. 1, 3, 9, 12 and 13, the free end of the inner band portion 31 of the separate clamping band part 30 is provided with a tongue-like extension 31' adapted to engage with the latching device generally designated by reference numeral 70. The latching device 70 is thereby formed by two short and narrow strips 71 and 71' laterally cut out L-shaped from the clamping band 21 within areas 75 and 75' (FIG. 14). The strips 71 and 71' are bent up and formed into more or less circular loops 72 and 72' (FIGS. 4, 10 and 14) whereby the free ends of these loops 72 and 72' are bent toward one another under angle α as shown in FIG. 4 so as to form in effect a spring-like detent for elastically receiving the tongue-like portion 31' which is of a width slightly greater than the width a (FIG. 4). As a result of this construction, the tongue-like portion 31', when being pressed down into the latching device 70, elastically spreads apart the free ends of the loop-like members 72 and 72' and is then retained in a detent-like manner close to the outer surface of the clamping band 21. The significant advantage of this detent-like retaining device resides in the fact that the separate band part 30 can no longer swing out but stays in its preassembled shipping condition, illustrated in FIG. 9, in which the three hooks 46 and 47 engage in the corresponding three apertures nearest the tongue-like extension 31' to provide maximum diametric dimension of the clamp. The clamp is thus reliably held in it preassembled condition with largest possible diametric dimension. Furthermore, as pointed out above, the need for a guide hook 47 now becomes unnecessary so that the guide hook 47 can now be replaced by a third cold-deformed support hook 46 as indicated schematically in dash-and-dotted lines in FIGS. 2 and 14, it being understood that the third support hook 46 will now be in the position of the guide hook 47. During installation of the clamp, one can effect a stepwise reduction of the clamp to its nearest diametric dimension as required for a given hose. It is necessary only to engage the loop-like portion 33 and the loop-like members 72, 72', either by hand or with the use of a conventional tool, such as a conventional fuse holder 80 (FIG. 12), to draw these parts together so as to effect a stepwise reduction of the diametric dimension of the screw-type clamp after it has been mounted over the hose to its size corresponding nearest to that of the hose. After this stepwise pre-adjustment corresponding to the existing external dimensions of the hose, the actual tightening operation can then be undertaken by tightening the screw-type device 40. FIG. 12 illustrates a clamp after initial coarse stepwise adjustment has taken place to conform to the external dimensions of the hose before actual tightening by means of the screw-type device 40 while FIG. 1 shows the clamp after being tightened by applying predetermined torque to the screw head 43 by means of any conventional tool to assure proper holding of the hose, for example, on the nipple of a radiator.

The tightening may thereby be achieved by means of a flexible screw driver or any appropriate tool such as a pneumatic screw driver as used on the assembly line.

An increase in the number of apertures 45 would increase adjustability of the adjusting range of a given screw-type clamp. However, the number of apertures which are theoretically feasible, is limited in practice by a number of considerations. One is the amount of band material required for an increase in the number of apertures 45. Another is the size of the clamp which limits the length of the various band parts. One might also theoretically increase the adjusting range of the clamping band by lengthening the threaded shank portion 42 of the screw member 40. However, again practical considerations as regards clamp design and space requirements place limitations on the length thereof.

With a typical clamp size of nominally 75 mm. containing five apertures 45 in the clamping band portion 31 of the separate clamping band part 30 in screw-type clamps which have been commercially available, hose diameters from the nominal 75 mm. to 69.1 mm. could still be securely tightened. However, a 10 mm. range in the reduction of the diametric dimension of the clamp from its nominal size is required in practice.

It has now been discovered that this range can be realized in a simple manner to provide a diametric dimensional change of 10 mm. of the nominal clamping size by the following measures in accordance with the present invention.

Instead of five apertures 45 as used in the prior commercially available clamps, seven such apertures 45 are now provided in the inner band part 31 of the separate clamping band part 30. Additionally, the sleeve 41, previously 10 mm. in length is now reduced to 8 mm. Furthermore, the last threads of the threaded shank portion 42 near its free end are deformed after being screwed through the band-tightening member 24 so that the screw-type tightening device 40 can now be opened up more fully without danger of undesired disassembly by unscrewing the screw member 42, 43 until automatically stopped by the deformed threads on the shank portion 42. These measures permit an increase in the screw-adjusting path from 3 mm. to 4 mm. As a result, the desired 10 mm. diametric adjusting range is now feasible by extraordinarily simple means without any major change in the external configuration of the clamp.

Additionally, by moving the beginning of the tongue portion 51 by about 5 mm. from its position in the prior commercial screw-type clamp, i.e., by lengthening the inner band portion by about 5 mm., the gap underneath the screw-type tightening device 40 can now be bridged by the full band width of the inner band portion 21a which in conjunction with the reinforcing ribs 57 and 57' reliably prevents buckling of the inner band portion into this gap.

The two guide tabs 59 and 59' in the inner band part 31 of the separate clamping band part 30 assist in keeping the two parts consisting of inner clamping band portion 21a and separate clamping band part 30 aligned with respect to one another when the clamp is mounted axially over the hose. Additionally, as pointed out above, it also assists in keeping the tongue portion 51 in the channel-like indentation 52.

As compared to the prior art commercially available screw-type clamps embodying the invention of my former U.S. Pat. No. 4,521,940, the means 51, 52, 56 and 55 to achieve an inner clamping surface devoid of discontinuities, gaps or steps are displaced further away from the pocket-like loop 24 while the tongue-like portion 51 as well as the channel-like indentation 52 are preferably somewhat lengthened.

The clamp, preassembled at the manufacturer, can now be installed in a far more convenient manner on the assembly line because the operator can mount the clamp axially without danger of misalignment and/or opening of its parts, can then pretighten the clamp manually in a stepwise manner and can then proceed with final tightening of the clamp by means, for example, of a pneumatic screwdriver with slippage clutch. The complete installation of a clamp in accordance with the present invention can be done therefore in two to three seconds.

However, the clamp in accordance with the present invention which can be mounted axially over the hose in preassembled condition as described above, can also be reopened again without difficulty in case of need. Its reusability is assured thereby in an extraordinarily simple manner. All that is necessary is to insert a small screwdriver or a piece of clamping band underneath the clamping band part 31 within the area of the loop 33 and to slide the same over the hooks 46, 47 in the direction of the tongue-like portion 31' which causes the clamp to open up by disengagement of the tongue-like portion 31' from the latching device 70. This reopening, however, preserves the reusability of the clamp.

As already mentioned, the tab-like members 59 and 59' perform the important function of guiding the inner band portion 21a underneath the screw-type tightening device thereby also retaining the tongue-like portion 51 securely in its assigned space in the channel-like indentation 52 during axial assembly. By utilizing two inwardly extending reinforcing ribs 57 and 57', any bending or buckling of the inner band portion 21a into the gap underneath the screw-type tightening device 40 is reliably avoided. Furthermore, the detent-like latching device 70 not only serves to hold the inner band portion 31 of the separate band part 30 onto the outer surface of the clamping band 21 but additionally serves as abutment in conjunction with the pocket-like loop 34 for the stepwise preadjustment of the clamp, either manually or with a simple tool as shown in FIG. 12.

FIGS. 15-17 illustrate a modified embodiment of a screw type clamp in accordance with the present invention in which an auxiliary spring structure generally designated by reference numeral 100 is provided to assist the retightening spring 44 in those cases where additional spring path is required, such as, for example, in sealed cooling systems for internal combustion engines in which relatively high coolant temperatures and pressures are reached. The auxiliary spring structure 100 includes a cage member generally designated by reference numeral 11 which is formed by the clamping band 21 itself. The convexly shaped crown portion 111 passes over into substantially rectilinear side portions 112 and 112' which in turn pass over into the substantially rectilinear bent-back portions 113 and 113' by way of convexly shaped connecting portions 114 and 114'. The bent-back portions 113 and 113', in turn, pass over into the clamping band by way of the concavely shaped connecting portions 115 and 115'. The cage-like member is provided with slot-like openings 126 and 126' (FIG. 16) which start within the area where the side portions 112 and 112' pass over into the convexly shaped connecting portions 114 and 114' and terminate within the area where the convexly shaped connecting portions 114 and 114' pass over into the bent-back portions 113 and 113'. The radii of curvature of connecting portions 115 and 115' are smaller than the radii of curvature of connecting portions 114 and 114' and the radii of curvature of the latter are smaller than the radius of curvature of the crown portion 111.

The separate spring member generally designated by reference numeral 130 which, in the illustrated embodiment, is made of solid spring material of any suitable type, includes a convexly shaped top portion 131 (FIG. 17) which has a width substantially corresponding to the width of the clamping band, i.e., to the width of the cage-like member 110. The top portion 131 passes over into narrow end portions 132 and 132' of substantially constant width by way of convexly shaped tapering portions defined by the tapering side surfaces 133a, 133b, 133c and 133d. The width of the narrow end portions 132 and 132' is thereby smaller than the width of the slot-like openings 126 and 126' so that the spring member 130, which is arranged inside of the cage-like member 110, engages with its narrowed end portions 132 and 132' the concavely shaped connecting portions 115 and 115' from the outside of the cage-like member 120. In case forces occur tending to increase the circumferential dimensions of the clamp, the auxiliary spring structure 100 will be available to provide additional retightening forces. By suitably selecting the spring characteristics of the retightening spring 44 and of the auxiliary spring member 130, it is possible to cause the auxiliary spring structure 100 to become operable at any desired point of compression of the retightening spring 44. Additionally, it is also possible to constitute the spring member 130 by a packet of inter-engaging separate leaf spring members as known in the art. As to the rest, what was said in connection with FIGS. 1-14 applies equally to the embodiment of FIGS. 15-17.

FIGS. 18 and 19 illustrate a screw-type clamp in accordance with the present invention provided with a modified embodiment of an auxiliary spring structure generally designated by reference numeral 140 which includes a number of separate leaf springs 141, 141', each consisting of a substantially flat top portion 143, 143' passing over into convexly shaped portions 144a and 144b, respectively, 144'a and 144'b which terminate in bent-up end portions 145a and 145b, respectively, 145a' and 145b' pointing in the direction toward the top portions 143 and 143'. The end portions 145a, 145b and 145'a and 145'b are thereby provided with rectangular apertures 146, 146' (FIG. 19) open toward the outside so as to be accessible therefrom. Apertures 146 and 146' serve for engagement with essentially S-shaped hooks 147 and 147' provided in the outer band portion 21b near the free end thereof and in the underlying band portion 22' within the area near the free end of the band portion 22' forming at the opposite end the pocket-like loop 23. The S-shaped hooks 147 and 147' thereby point outwardly and away from one another. The auxiliary spring structure 140 of this embodiment thus takes over the connection between the clamping band portions 21b and 22', 21a whereby the gap underneath the spring members 141, 141' is again covered by the full band width of the inner band portion 21a. In the presence of forces seeking to increase the circumferential dimension of the clamp, the leaf springs 141, 141' will be elastically expanded so as to provide the additional spring action which, by proper selection of the spring characteristics of the retightening spring 44 and of the leaf spring members 141, 141' can be made to start at any point in the compression of the retightening spring 44. While only two leaf spring members have been shown, it is of course possible to provide more than two leaf springs or to use a single spring member of suitable spring material and with appropriate spring characteristics.

The auxiliary spring structures shown in FIGS. 15-19 are similar to those described in my copending application Ser. No. 07/681,893, filed Apr. 8, 1991 and entitled "Clamp Structure With Improved Spring Action" (D/21515), the subject matter of which is incorporated herein by reference.

The embodiment of FIGS. 20 and 21 in which similar reference numerals of the 300 series are used for corresponding parts, illustrates a screw-type clamp which minimizes, respectively eliminates any imbalances, important for use of such clamps on rotating parts. Differing from the embodiment of FIGS. 15-17, the auxiliary spring structure 300 is located substantially opposite the screw-type tightening device 340 to compensate for the extra weight of the latter and the separate band part 330 which is fixedly connected at 325 with the clamping band 321 does not include length-adjusting apertures 45, thereby also obviating the need for the extension 31' and latching device 70. As the screw-type tightening device 340 is not symmetrical with respect to a vertical axial plane x owing to the additional weight of the sleeve member 341, the spring 344 and the screw head 343 and the auxiliary clamp structure may not exactly compensate for the existing imbalance, it is within the purview of the present invention to locate the auxiliary spring structure, for example, by a smaller angular displacement from the vertical axis x in the counterclockwise direction as viewed in FIG. 20. It is, of course, also possible to eliminate any remaining imbalance by the presence of openings in the clamping band itself, suitably located as determined by conventional means. These openings may be round openings and/or oval openings, and/or openings of any other suitable configuration which should be so placed in the clamping band that in the normally tightened position of the various parts, the clamp is balanced.

In a particularly advantageous construction of this invention, these openings may be so constructed as to impart elastic stretchability to the clamping band itself. FIG. 21 illustrates several sections generally designated by reference numeral 380 of such configuration that limited elastic stretchability is imparted to the clamping band. More particularly, each section 380 thereby includes concavely curved lateral band portions 381a and 381b defining a central opening 382 resembling an hourglass. The sections are interconnected by web portions 383 of substantially constant dimension in the longitudinal direction of the clamping band and representing the full band width. The lateral band portions 381a and 381b are thereby of substantially constant thickness which is achieved by substantially parallel cuts 384a, 385a and 384b, 385b defining the lateral cut-outs as well as central cutout in each section. The transitions from the cutouts 385a and 385b to the end surfaces 389 defining the webs 383 as also the transitions from the concavely shaped cutouts 384a and 384b into the full width clamping band are preferably rounded off as shown in the drawing. It is understood that the number of sections 380 can be chosen as needed and their location be selected for any part of the clamp structure as required in a given case.

Differing from the embodiment of FIGS. 15-17, the embodiment of FIGS. 20 and 21 does not provide for the increased diametric adjustment as the bent-back end portion 332 of the separate clamping band part 330 is secured fixedly together with its underlying clamping band portion 331 to the underlying band portion 321 by the connection 325. The outer band portion 321b starting with bent-back portion 322 and the pocket-like loop 323 and after forming the cage-like member 110 and providing the pressed-out, channel-like indentation 352 intermediate the step-like portions 356 and 355 then extends underneath the separate clamping band part 330 to which it is fixedly secured by the connection 335. The clamping band then extends underneath the screw-type tightening device 340 to form the inner band portion 321a which is provided with the tongue portion 351 at its end. FIG. 20 thus does not provide the stepwise preadjustment possible with the embodiments of FIGS. 1-19 nor does it require the latching device of the latter embodiments as there is no free tongue portion 31' in this embodiment.

However, the balanced screw-type clamp structure of FIG. 20 can also be modified to provide the additional features of the embodiment of FIGS. 15-17 by providing a lengthened clamping band part 330 with seven apertures and with a tongue portion cooperating with a latching device. Optimum location for the various parts can be readily determined empirically.

FIG. 22 illustrates a do-it-yourself screw-type clamp system in which a standard clamp part generally designated by reference numeral 220, constructed as shown in FIG. 1, is cut open and provided at each end with outwardly extending support hooks 246, possibly in combination with a guide hook 247 as disclosed in my U.S. Pat. No. 4,299,012 and with a preassembly hook 248 as disclosed in my U.S. Pat. No. 4,492,004 or with a snap-in preassembly hook as disclosed in my copending application Ser. No. 06/942,694 for engagement in the apertures 245 provided in the clamping band 221 which may be a commercially available perforated band steel. Adjacent the four apertures 245, the clamping band 221 includes an outwardly extending step 256 provided with a further aperture 245 to receive the tongue-like portions 251 so as to provide a transition devoid of any discontinuities, gaps or steps in the circumferential direction of the clamping surface, as disclosed, for example, in my prior U.S. Pat. No. 4,315,348, or in my prior U.S. Pat. No. 4,299,012. In the embodiment of FIG. 22, the latching device 70 and the tongue portion 31' are omitted, the underlying clamping band portion 31 of the separate clamping band part 30 being held into the clamping band 21 by a hook 270. However, the standard clamp part 220 may also be provided with a tongue portion 31' and a latching device 70 as shown in FIGS. 1-14 or 23-25 by approximately lengthening the clamping band parts affected by such addition. In that case, hook 270 will no longer be needed. It is thus possible with this system to obtain a screw-type clamp of any desired size which offers all of the advantages of the clamp of FIGS. 1-14 and which merely requires the standard open screw-type clamp together with a supply of perforated band steel.

FIGS. 23-25 illustrate two modified embodiments of a latching device generally designated by reference numeral 170 which provides a snap-fastener-type latching action that can be easily released as will be described more fully hereinafter. The lateral strips 172 and 172', which are again cut out of the clamping band 21, are bent into substantially U-shaped eyelets as viewed in side view (FIGS. 23 and 25). Rather than being L-shaped cut-out strips as in FIG. 14, the front faces 172a and 172'a of the strips 172 and 172' are provided with rounded-off tapering surfaces as shown in FIG. 24 to provide the snap-fastener-type action. The strips 172 and 172' are thereby again bent slightly so as to converge toward one another under the angle a, whereby the dimension a is again somewhat smaller than the width of the tongue portion 31'. When the tongue portion 31' is thus pressed down from its dash-and-dotted line position in FIG. 24 into its full line position, a snap-fastener-like latching action is achieved holding the tongue portion 31' onto the clamping band 21. To disengage the tongue portion, it is only necessary to lift the tongue portion 31' against the latching action which can be easily achieved by inserting a screwdriver underneath the tongue portion 31' from in front thereof. For that purpose, the free end 31'a is slightly bent up (FIG. 23) in order that the tongue portion can be readily lifted by means of a screwdriver or the like. A small hole 78 may be provided in the bent-up portion 31'a in order that the disengagement can additionally be achieved by inserting a hook into the hole. In the alternative, the end of the tongue portion 31' may also be provided with a loop 31'b bent up at right angle or bent back to an even greater extent as shown in dash and dotted lines which facilitates opening of the clamp by merely suspending a string, wire, hook or the like in the loop 31'b or in a similar opening 78 provided therein. It is thereby preferable to slightly lengthen the tongue portion 31' to permit the formation of the loop 31'b.

The solution described in connection with FIGS. 23-25 also permits manufacture in an extraordinarily simple manner of this snap-fastener-type latching device because all parts can be easily punched out by simple tools.

While I have shown and described several embodiments in accordance with the present invention, it is understood that the same is not limited thereto but is susceptible of numerous changes and modifications as known to those skilled in the art. For example, the retightening spring 44 can be omitted, particularly when an auxiliary spring structure 100 or 140 is provided. Additionally, the mechanical interconnections of the various parts may be realized in any known manner. An inner clamping surface devoid of any gaps, steps or discontinuities may also be achieved as disclosed in my prior U.S. Pat. No. 4,315,348. I therefore do not wish to be limited to the details shown and described herein but intend to cover all such changes and modifications as known to those skilled in the art.

I claim:

1. A screw-type clamp including clamping band means whose one end is bent back upon itself and secured to the underlying clamping band portion in such a manner as to form a first pocket-like loop accommodating a first, at least part-cylindrical tightening member, a separate clamping band part whose one end is also bent back upon itself to form a second pocket-like loop accommodating a second, at least part-cylindrical tightening member, threaded means for tightening the clamp including a screw member provided with a screw head and a threaded shank portion extending through the second tightening member and threadably engaging with the first tightening member, a sleeve member mounted over the threaded shank portion and abutting at the second tightening member on the side nearer the screw head, the inner band portion of the separate clamping band part being provided with aperture means for engagement with outwardly extending hook means provided in the clamping band means, characterized in that a predetermined number of aperture means are provided for engagement by a number of hook means smaller than the number of aperture means to provide stepwise adjustment of the clamp diameter, in that the sleeve member is of predetermined axial length and in that the end threads of the threaded shank are deformed so that the screw member can be utilized over nearly its entire length without danger of disassembly of the clamp, whereby an adjusting range is possible which permits the use of discrete clamp sizes accommodating the tolerance ranges encountered in commercially available hoses without having to change clamp size.

2. A clamp according to claim 1, wherein the number of said aperture means is seven.

3. A clamp according to claim 1, wherein said hook means are exclusively cold-deformed support hooks.

4. A clamp according to claim 1, wherein the inner band portion of said separate clamping band part is provided with inwardly projecting circumferentially extending tab-like members operable to engage with the inner clamping band portion of the clamping band means within the area of cut-outs provided in the inner clamping band portion and of a dimension slightly greater than the thickness of the clamping band material so that the inner band portion is safely guided during axial mounting of the clamp.

5. A clamp according to claim 4, wherein the inner band portion of the clamping band means is provided with two inwardly extending reinforcing ribs spaced from one another in the transverse direction and provided within the area of the inner clamping band portion which will come to lie underneath the gap intermediate the pocket-like loops with the clamp in its installed condition.

6. A clamp according to claim 5, wherein said ribs are spaced from one another in a transverse direction a distance such that the ribs are located a small distance from the edges formed by the cutouts.

7. A clamp according to claim 1, with means to obtain an inner clamping surface devoid of any gaps, discontinuities or steps which includes a tongue portion at the inner clamping band portion adapted to engage in a tongue-receiving means provided in the overlapping outer band portion, characterized in that the inner band portion of the clamping band means is provided with inwardly extending reinforcing ribs spaced in the transverse direction, and in that the ribs commence within the area of the inner band portion near the end thereof where the tongue portion commences.

8. A clamp according to claim 1, characterized by latching means for holding the inner band portion of the separate clamping band part at least close to the outer surface of the clamping band means within the area of the clamping band means provided with said hook means so as to provide a preassembly position in which the hook means are operable to engage with said aperture means.

9. A clamp according to claim 8, characterized in that the latching means is in the form of a detent-like device adapted to hold down a tongue-like portion provided at the free end of the inner band portion of the separate band part at least close to the outer surface of the clamping band means.

10. A clamp according to claim 9, wherein said latching means is formed in the clamping band itself.

11. A clamp according to claim 10, wherein said latching means is formed by two strips laterally cut out from the clamping band means which are bent up into the form of loop-like portions whose free ends slightly converge toward one another so as to provide an entrance width wider than the width of the tongue-like portion and a width near the free ends of the strips that is slightly narrower than the tongue-like extension.

12. A clamp according to claim 11, wherein said loop-like parts constitute an elastic detent-like means.

13. A clamp according to claim 11, wherein the free ends of the strips are rounded-off and said look-like parts constitute a snap-button-like detent device.

14. A clamp according to claim 1, further comprising spring means in said clamp to provide an automatic retightening force.

15. A clamp according to claim 14, wherein said spring means includes a retightening spring mounted over said shank portion between said sleeve member and the screw-head.

16. A clamp according to claim 14, wherein said spring means includes an auxiliary spring structure having a cage means formed by the clamping band means, and at least one convexly shaped auxiliary spring means within said cage means and having free end portions extending through openings in the cage means to engage the latter from the outside.

17. A clamp according to claim 16, wherein said cage means includes side portions passing over into bent-back portions by way of convexly shaped connecting portions and wherein the bent-back portions pass over into the clamping band means by way of concavely shaped connecting portions, said openings being provided in said convexly shaped connecting portions, and the free ends of the convexly shaped auxiliary spring means engaging the concavely shaped connecting portions from the outside thereof.

18. A clamp according to claim 14, wherein the spring means includes an auxiliary spring structure having at least one convexly shaped leaf spring whose free ends are provided with openings to receive connecting members extending outwardly from the outer band portion and the underlying band portion passing over into the first pocket-like loop in the opposite direction.

19. A clamp according to claim 18, wherein the one end of the clamping band means is connected with the adjoining clamping band means by said auxiliary spring structure.

20. A self-retightening screw-type clamp including clamping band means whose one end is bent back upon itself and secured to the underlying clamping band portion in such a manner as to form a first pocket-like loop accommodating a first, at least part-cylindrical tightening member, a separate clamping band part whose one end is also bent back upon itself to form a second pocket-like loop accommodating a second, at least part-cylindrical tightening member, threaded means for tightening the clamp including a screw member provided with a screw head and a threaded shank portion extending through the second tightening member and threadably engaging with the first tightening member, a sleeve member mounted over the threaded shank portion and abutting at the second tightening member on the side nearer the screw head, and a retightening spring means interposed between the sleeve member and the screw head, the inner band portion of the separate clamping band part being provided with aperture means for engagement with outwardly extending hook means provided in the clamping band means, characterized in that the clamp comprises further means for the stepwise adjustment of the clamp diameter from a preassembled condition over a predetermined range, said further means including a predetermined number of said aperture means for engagement by a number of hook means smaller than the number of aperture means to provide the stepwise adjustment of the clamp diameter, the sleeve member being of predetermined axial length, and the end threads of the threaded shank being deformed so that the screw member can be opened up to nearly its maximum length without danger of disassembly of the clamp, whereby an adjusting range is possible which permits the use of discrete clamp sizes accommodating the tolerance ranges encountered with nominal sizes of commercially available hoses without having to change clamp size.

21. A clamp according to claim 20, wherein said hook means are exclusively cold-deformed support hooks.

22. A clamp according to claim 21, wherein the inner band portion of said separate clamping band part is provided with inwardly projecting circumferentially extending tab-like members operable to engage with the inner clamping band portion of the clamping band means within the area of cut-outs of a size sufficient to accommodate the tab-like members so that the inner band portion is safely guided during axial mounting of the clamp.

23. A clamp according to claim 22, wherein the inner band portion of the clamping band means is provided with two inwardly extending reinforcing ribs spaced from one another in the transverse direction and provided within the area of the inner clamping band portion which will come to lie underneath the gap intermediate the pocket-like loops when the clamp is in its installed condition.

24. A clamp according to claim 23, wherein said ribs are spaced from one another in a transverse direction a distance such that the ribs are located a small distance from the edges of the inner band portion formed by the cutouts.

25. A screw-type clamp including clamping band means whose one end is bent back upon itself and secured to the underlying clamping band portion in such a manner as to form a first pocket-like loop accommodating a first, at least part-cylindrical tightening member, a separate clamping band part whose one end is also bent back upon itself to form a second pocket-like loop accommodating a second, at least part-cylindrical tightening member, threaded means for tightening the clamp including a screw member provided with a screw head and a threaded shank portion extending through the second tightening member in the second loop and threadeably engaging with the first tightening member in the first pocket-like loop, the inner band portion of the separate clamping band part being provided with aperture means for engagement with outwardly extending hook means provided in the clamping band means, characterized by latching means formed within the clamping band means in an area opposite its free end relative to the hook means and operable for retaining a tongue-like extension provided at the free end of the underlying band portion of the separate band part at least close to the outer surface of the clamping band means.

26. A clamp according to claim 25, wherein said latching means is formed in the clamping band itself.

27. A clamp according to claim 26, wherein said latching means is formed by two strips laterally cut from the clamping band means which are bent up into the form of loop-like portions whose free ends slightly converge toward one another so as to provide an entrance width wider than the width of the tongue-like extension and a width near the free ends of the strips that is slightly narrower than the tongue-like extension.

28. A clamp according to claim 27, wherein said loop-like portions constitute a detent-like device.

29. A clamp according to claim 28, wherein said loop-like portions constitute a snap-button-like detent device.

30. A clamp according to claim 29, wherein the mutually facing surfaces of the strips near the free ends thereof are rounded-off to achieve a snap-button-like action.

31. A clamp according to claim 30, wherein the free end of the tongue-like extension is bent-up to facilitate disengagement of the tongue-like extension from the latching means.

32. A clamp according to claim 30, wherein the free end of the tongue-like extension is bent into a loop to facilitate disengagement of the tongue-like extension from the latching means.

33. A screw-type clamp including clamping band means whose one end is bent back upon itself and secured to the underlying clamping band portion in such a manner as to form a first pocket-like loop accommodating a first, at least part-cylindrical tightening member, a separate clamping band part whose one end is also bent back upon itself to form a second pocket-like loop accommodating a second, at least part-cylindrical tightening member, threaded means for tightening the clamp including a screw member provided with a screw head and a threaded shank portion extending through the tightening member in the second loop and threadably engaging with the tightening member in the first-mentioned loop, a sleeve member mounted over the threaded shank portion and abutting at the second tightening member on the side nearer the screw head, and a retightening spring means interposed between the sleeve member and the screw head, the inner band portion of the separate clamping band part being provided with aperture means for engagement with outwardly extending hook means provided in the clamping band means, characterized by an auxiliary spring structure in the clamp to assist the retightening spring means.

34. A clamp according to claim 33, wherein said auxiliary spring structure includes a cage means formed by the clamping band means, and convexly shaped auxiliary spring means within said cage means and having free end portions extending through openings in the cage means to engage the latter from the outside.

35. A clamp according to claim 34, wherein said cage means includes side portions passing over into bent-back portions by way of convexly shaped connecting portions and wherein the bent-back portions pass over into the clamping band means by way of concavely shaped connecting portions, said opening being provided in said convexly shaped connecting portions, and the free ends of the auxiliary spring means engaging the concavely shaped connecting portions from the outside thereof.

36. A clamp according to claim 33, wherein the auxiliary spring structure includes at least one convexly shaped leaf spring whose free ends are provided with openings to receiving connecting members extending outwardly from the outer band portion and the inner underlying band portion which, in the opposite direction, passes over into the first pocket-like loop.

37. A clamp according to claim 36, wherein the auxiliary spring structure together with the last-mentioned connecting members constitute a mechanical connection between the one end of the clamping band means and the adjoining part of the clamping band means.

38. A clamp according to claim 33, further comprising latching means for holding down a tongue-like extension provided at the free end of the inner band portion of the separate band part at least close to the outer surface of the clamping band means.

39. A clamp according to claim 38, characterized in that the latching means is in the form of a means adapted to hold a tongue-like extension provided at the free end of the inner band portion of the separate band part at least close to the outer surface of the clamping band means.

40. A clamp according to claim 39, wherein said latching means is formed in the clamping band means itself.

41. A clamp structure for a do-it-yourself system capable of providing a screw-type clamp of any desired size and having a predetermined adjusting range with stepwise adjustment including clamping band means, a separate clamping band part whose one end is bent back upon itself, threaded means for tightening the clamp, the inner band portion of the separate clamping band part being provided with aperture means for engagement with outwardly extending hook means provided in the clamping band means, the number of hook means being smaller than the number of aperture means, latching means for holding the inner band portion of the separate clamping band part at least close to the outer surface of the clamping band means within the area of the hook means, and tongue-receiving means in the clamping band means, characterized in that the clamping band means is cut intermediate the latching means and the tongue-receiving means to form a standard part with a tongue-like extension and a number of outwardly extending hooks at each end of the cut clamping band means for engagement in apertures provided in a clamping band part selectively cut to predetermined length to achieve a desired clamp size.

42. A clamp according to claim 41, wherein each aperture constituting a tongue-receiving means for engagement with a respective tongue-like extension is located in an outwardly extending step-like portion to assure an internal clamping surface devoid of any discontinuities, gaps or steps.

43. A clamp according to claim 42, wherein the clamping band part cut to predetermined size is a perforated clamping band, and wherein the standard clamp part is provided with a preassembly hook means adapted to engage in one of said last-mentioned apertures.

* * * * *